United States Patent
Fujioka et al.

(10) Patent No.: US 6,313,430 B1
(45) Date of Patent: Nov. 6, 2001

(54) PLASMA PROCESSING APPARATUS AND PLASMA PROCESSING METHOD

(75) Inventors: Yasushi Fujioka, Kyoto; Shotaro Okabe, Nara; Masahiro Kanai, Kyoto; Akira Sakai, Kyoto; Tadashi Sawayama, Kyoto; Yuzo Kohda, Kyotanabe, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/258,208

(22) Filed: Feb. 26, 1999

(30) Foreign Application Priority Data

Feb. 26, 1998 (JP) .................................................. 10-045083
Feb. 24, 1999 (JP) .................................................. 11-046504

(51) Int. Cl.[7] .................................................. B23K 9/06
(52) U.S. Cl. .............................. 219/121.57; 219/121.36; 204/192.13; 324/644
(58) Field of Search .................... 219/121.57, 121.52, 219/130.21, 121.54, 121.43, 121.58, 121.83, 121.36; 204/192.13, 192.26; 324/767, 644, 629; 427/569; 333/17.3, 33; 156/345

(56) References Cited

U.S. PATENT DOCUMENTS

| | | | |
|---|---|---|---|
| 5,049,816 | * | 9/1991 | Moslehi .................................. 324/767 |
| 5,459,405 | * | 10/1995 | Wolff et al. ............................ 324/644 |
| 5,629,653 | * | 5/1997 | Stimson .................................. 333/17.3 |
| 5,846,612 | * | 12/1998 | Takaki et al. .......................... 427/569 |
| 5,911,856 | * | 6/1999 | Suzuki et al. ..................... 204/192.13 |

OTHER PUBLICATIONS

A. Shah et al., "VHF Plasma Deposition: Comparative Overview", Mat. Res. Soc. Symp. Proc., vol. 258, pp. 15–26 (1992).*

* cited by examiner

Primary Examiner—Teresa Walberg
Assistant Examiner—Quang Van
(74) Attorney, Agent, or Firm—Fitzpatrick, Cella, Harper & Scinto

(57) ABSTRACT

A high frequency plasma processing apparatus and a high frequency plasma processing method according to the invention can suitably be used for uniformly forming on a substrate a deposition film over a large area. The apparatus and the related method solve the problem wherein high frequency power supplied to a known plasma processing apparatus can become distorted to produce harmonics and give rise to difficulty in correctly reading the incident and reflected powers and realizing an accurate matching when a VHF is used in order to raise the processing rate.

27 Claims, 8 Drawing Sheets

PLASMA PROCESSING APPARATUS AND PLASMA PROCESSING METHOD

BACKGROUND OF THE INVENTION

1. Field of the Invention

This invention generally relates to a processing apparatus and a processing method using plasma and, more particularly, it relates to a plasma processing apparatus and a plasma processing method that can suitably be used for forming on a substrate a deposition film of a non-single crystal, silicon-based semiconductor such as amorphous silicon, amorphous silicon germanium, amorphous silicon carbide or fine crystal silicon that can be used for thin film solar batteries, or for conducting a processing operation using plasma such as etching, annealing or ashing.

2. Related Background Art

Among non-single crystal semiconductors, amorphous silicon provides a particular advantage, as a semiconductor film can be formed of it with a large area by means of plasma CVD so that it is more adapted to produce a semiconductor device having a large area than crystal silicon or polycrystal silicon.

Therefore, amorphous silicon film is used for semiconductor devices that need to show a large area such as solar batteries, photosensitive drums of copying machines, image sensors of facsimile equipment and thin film transistors of liquid crystal displays.

Thus, these devices using amorphous silicon film occupy a large area as compared with a device made of a crystal semiconductor such as LSI or CCD. In the case of a solar battery showing a conversion efficiency of 10%, an area of about 30 m² may be required for it to produce the power output rate of about 3 kW that is required to feed an ordinary family; each solar battery element will be required to have a considerably large area. Therefore, there is a need for techniques which quickly form a deposition film having a large area.

A plasma CVD method typically used for forming an amorphous silicon film consists in producing plasma of a source gas containing silicon in the form of $SiH_4$ or $Si_2H_6$ by decomposing it by means of high frequency electric discharge to form a film on a substrate placed in the plasma.

A high frequency wave with an RF (of about 13.56 MHz) has been popularly used for forming an amorphous silicon film by means of plasma CVD.

However, in recent years, a plasma CVD technique using a VHF has been attracting attention. For example, Amorphous Silicon Technology, 1992, p.15–p.26 (Materials Research Society Symposium Proceedings, Volume 258) reports the use of a discharge frequency in the VHF zone in place of 13.56 MHz in the RF zone to remarkably raise the film forming rate and produce excellent deposition film at an enhanced rate.

On the other hand, as a result of a series of experiments conducted by the inventors of the present invention in an attempt to produce a deposition film having a large area by means of plasma CVD using such a VHF, it has been found that the following points should be considered.

When the discharge electrode of a diode parallel plate plasma CVD system that is normally used with an RF to produce a deposition film having a large area is utilized with a VHF, a desired electric discharge occurs as in the case of using an RF when the discharge electrode has a relatively small area but the discharge electrode comes to show a large impedance to make it impossible to drive the matching circuit properly so that power cannot be used effectively when the discharge electrode is made to have a large area in order to produce evenly distributed plasma.

This problem may conveniently be avoided by using a discharge electrode not in the form of a plate but a straight rod or a rod with radial fins or comb-like teeth having a relatively small surface area for producing plasma evenly over a large area. However, the use of such a discharge electrode considerably reduces its impedance so that the electric discharge is significantly affected by the stray capacitance found between the discharge electrode and the matching circuit, and the waveform of the high frequency wave can easily become distorted beyond the matching circuit to give rise to harmonics. As the waveform of the high frequency wave is distorted and harmonics are generated, problems arise including that the applied power cannot be determined correctly, that a correct matching cannot be realized and that the reproducibility of the application of high frequency power can become very low.

FIG. 1 of the accompanying drawings illustrates a deposition film forming apparatus utilizing plasma CVD as a type of plasma processing apparatus.

The deposition film forming apparatus of FIG. 1 comprises as major components thereof a plasma processing section (depositing section) 101 and a high frequency power source section 102. The plasma processing section 101 has a vacuum vessel 103 containing therein a discharge chamber 104, which has gas inlet pipe 106 for introducing desired gas into the discharge chamber 104 and an exhaust pipe 105 for evacuating the inside of the discharge chamber 104. The substrate 107 to be processed by means of plasma (on which a deposition film is formed) is placed on a substrate mount section arranged in the discharge chamber 104. An appropriate heater 108 is provided in the vacuum vessel 103 to heat the substrate 107 to a desired temperature level or maintain the temperature of the substrate 107 to a desired level.

An antenna 109 is arranged in the discharge chamber 104 by way of a high frequency power introducing section 122 arranged in the vacuum vessel 103. The antenna 109 is electrically connected to the high frequency power source 102.

The high frequency power source 102 includes as major components a high frequency power supply circuit section 110 adapted to oscillate at a high frequency and absorb reflected waves, a power detection circuit section 111 for detecting incident and reflected high frequency power and a matching circuit 112.

The high frequency power supply circuit section 110 has a high frequency oscillation circuit 113, a circulator 114 and a reflected wave absorbing load 115, whereas the power detection circuit section 111 has a directional coupler 116 as well as a pair of detectors 117, a pair of amplifiers 118 and a pair of meters 119 connected to the directional coupler 116 for incident power and reflected power respectively.

The high frequency power (traveling wave) from the directional coupler 116 is regulated for impedance by way of the matching circuit 112 after passing through a high frequency cable 121 and before reaching the antenna 109. The reflected wave from the antenna 109 reversely follows the route of the traveling wave until it reaches the directional coupler 116.

Thus, in a deposition film forming apparatus adapted to use plasma CVD as shown in FIG. 1, the applied high frequency power is read by a power detection circuit 111 typically provided in the high frequency power source 102 for both incident power and reflected power. If the power detection circuit 111 is of the transmission type employing a directional coupler 116 for constantly monitor the power, the power detection circuit 111 is so calibrated as to indicate the right value only for the fundamental oscillation frequency. Therefore, if the high frequency wave shows a distorted waveform beyond the matching circuit 112 to produce harmonics, the reflected waves of a number of harmonics reach the power detection circuit 111 of the high frequency power source 102. In this way, both the incident power and the reflected power cannot be read correctly, thereby rendering the matching operation inaccurate.

SUMMARY OF THE INVENTION

Therefore, it is an object of the present invention to provide a plasma processing apparatus and a plasma processing method that can suitably be used for carrying out a processing operation, using plasma, uniformly over a large area with an enhanced degree of reproducibility. The present invention solves the problem that the introduced high frequency power is distorted to become apt to generate harmonics and make it impossible to accurately read both the incident power and the reflected power and realize an accurate matching.

An object of the present invention is thus to provide a plasma processing apparatus adapted to apply high frequency power to the inside of a vacuum vessel to generate plasma to be used for a processing operation, wherein the fundamental oscillation frequency of the high frequency power is a VHF and low pass filters for passing (maintaining) the fundamental oscillation frequency component and damping any harmonics thereof are inserted into the incident power and/or reflected power detection circuit of the high frequency power source of the apparatus.

Preferably, in a plasma processing apparatus according to invention, the incident power and/or reflected power detection circuit of the high frequency power source comprises a directional coupler and detectors connected to the directional coupler and the low pass filters are inserted between the directional coupler and the respective detectors.

Preferably, in a plasma processing apparatus according to the invention, the discharge electrode is a rod-shaped electrode.

Another object of the present invention is to provide a plasma processing method adapted to apply high frequency power to the inside of a vacuum vessel to generate plasma to be used for a processing operation, wherein the fundamental oscillation frequency of the high frequency power is a VHF and detected by way of low pass filters for passing (maintaining) the fundamental oscillation frequency component and damping any harmonics thereof.

Preferably, with a plasma processing method according to the invention, the matching between the load and the power source is controlled according to the detected value of the fundamental oscillation frequency component.

DESCRIPTION OF THE PREFERRED EMBODIMENTS

Now, the present invention will be described in greater detail by referring to the accompanying drawings that illustrate preferred embodiments of the invention.

Figure 2:
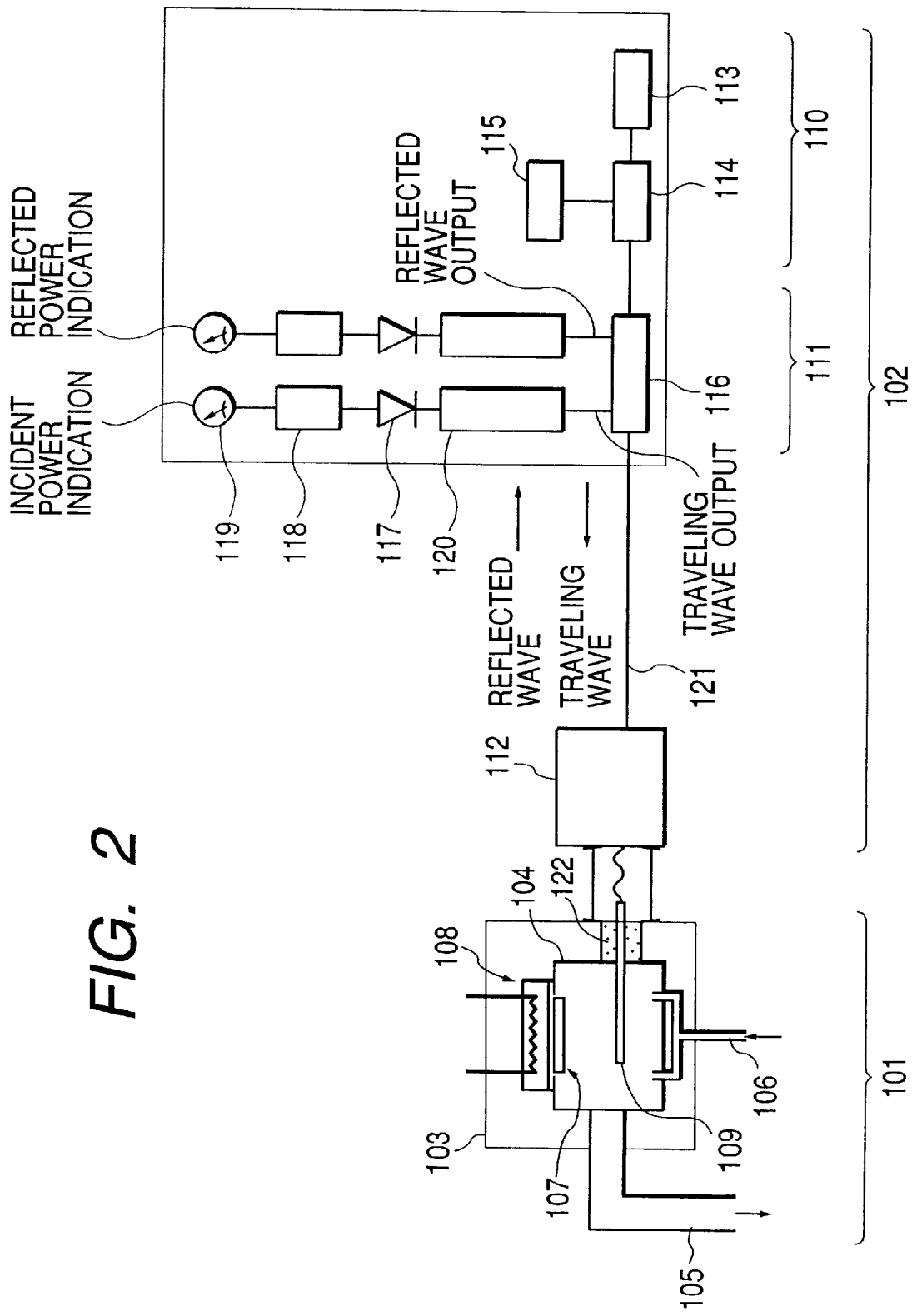
FIG. 2 is a diagram of another plasma processing apparatus, schematically illustrating its configuration.

FIG. 2 is a block diagram of a plasma processing apparatus according to the invention in the form of a deposition film forming apparatus adapted to use plasma CVD.

Figure 1:
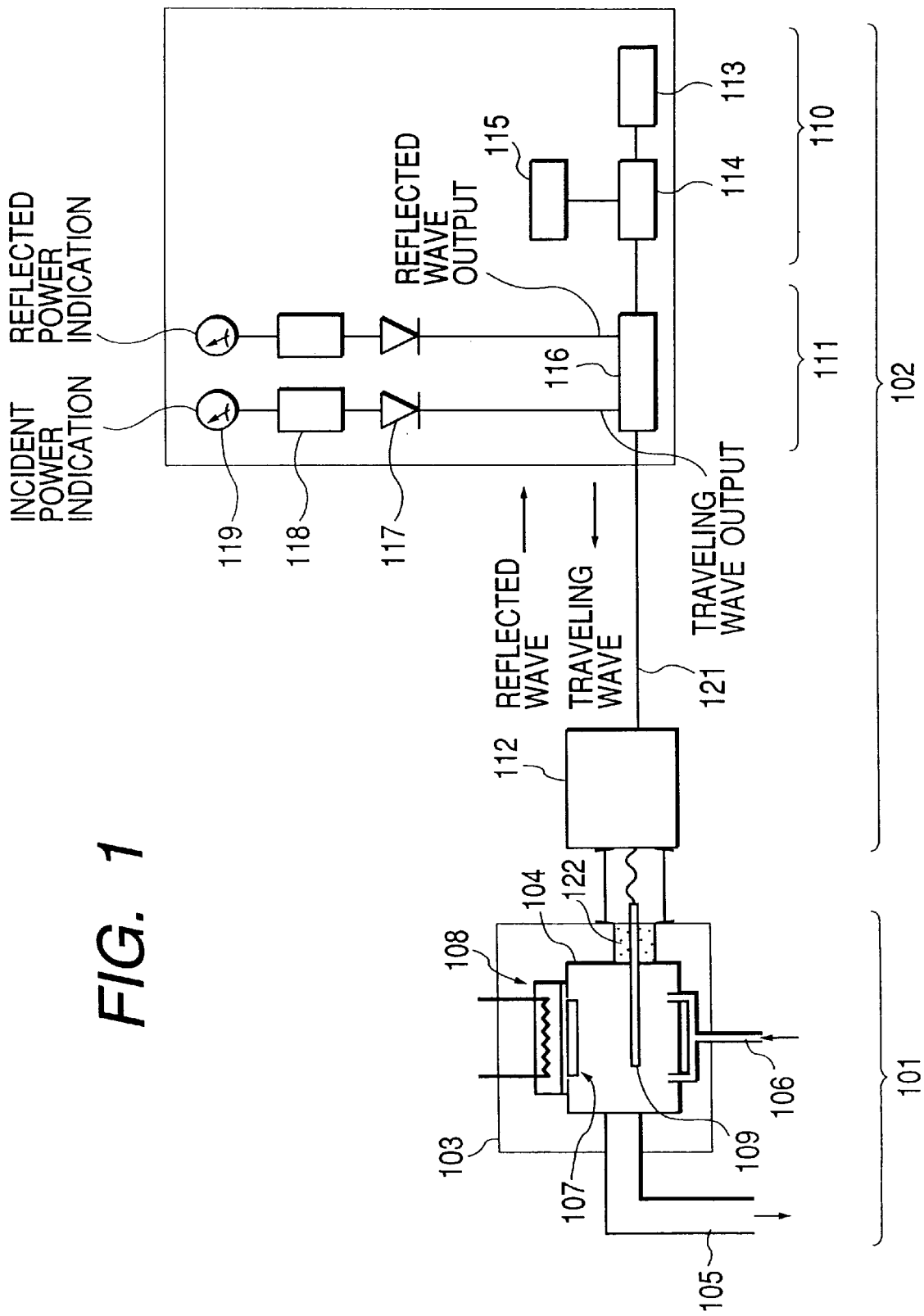
FIG. 1 is a diagram of a plasma processing apparatus, schematically illustrating its configuration.

The components of the apparatus of FIG. 2 that are the same as or similar to those of the apparatus of FIG. 1 are denoted respectively by the same reference symbols. The deposition film forming apparatus comprises as major components thereof a plasma processing section 101 and a high frequency power source section 102. The plasma processing section 101 has a vacuum vessel 103 containing therein a discharge chamber 104, which discharge chamber 104 is provided with an exhaust pipe 105 connected to an exhaust system (not shown), a gas inlet pipe 106 for introducing source gas (etching gas and diluting gas in the case of etching) into the discharge chamber 104, a substrate 107 to be deposited thereon with a deposition film, a heater 108 for heating the substrate 107 and an antenna 109 for emitting high frequency power so that a deposition film may be formed on the heated substrate 107 by means of plasma CVD.

On the other hand, the high frequency power source section 102 has a high frequency power supply circuit 110 adapted to oscillate at a high frequency and absorb reflected waves, a power detection circuit 111 for detecting incident and reflected high frequency powers, a matching circuit 112 for providing impedance matching between the plasma processing section 101 and the load and a high frequency cable 121.

The high frequency power supply circuit 110 includes a high frequency oscillation circuit 113, a circulator 114 and a reflected wave absorbing load 115, whereas the power detection circuit 111 includes a directional coupler 116, a pair of detectors 117, a pair of amplifiers 118, a pair of meters 119 and a pair of low pass filters 120 that are inserted between the directional coupler 116 and the respective detectors 117. Thus, the apparatus of FIG. 2 differs from that of FIG. 1 in that the former has low pass filters 120.

With an apparatus having a configuration as described above, due to the low pass filters 120 arranged in the power detection circuit 111 inserted between the high frequency power supply circuit 110 and the matching circuit 112 and adapted to pass (maintain) the fundamental oscillation frequency component and damp any harmonics thereof, if the waveform of the high frequency power is distorted to generate harmonics of the fundamental oscillation frequency between the matching circuit 112 and the plasma processing section 101 and the generated harmonics are reflected back to the power detection circuit 111 as reflected waves, the power detection circuit 111 can detect only the incident power and the reflected power with the fundamental oscillation frequency without being affected by the reflected harmonics.

Thus the above apparatus is free from the above described problem that harmonics are apt to be generated, thereby making it impossible to accurately read both the incident power and the reflected power and realize an accurate matching, Hence, the reproducibility of the application of high frequency power can be remarkably improved.

Now, the present invention will be described by way of embodiments.

<Low Pass Filter 120>

A low pass filter that can suitably be used for an apparatus according to the invention can satisfactorily maintain the fundamental oscillation frequency component of the high frequency power source and effectively damp harmonics including the second harmonic and the third harmonic.

If, for example, the fundamental waveform is 100 MHz, the low pass filter preferably maintains the 100 MHz wave by more than 90%, while damping the 200 MHz and 300 MHz waves to less than 10%.

The low pass filter may have a circuit configuration of any filter circuit for high frequencies realized by combining one or more than one inductances and one or more than one electrostatic capacitances to show desired frequency-passing characteristics.

For the purpose of the present invention, a low pass filter refers to a filter adapted to block the passage of any high frequency waves above a predetermined frequency level, which may be a band pass filter designed to pass only waves in a predetermined frequency band.

Specific examples of filters that can be used for the purpose of the invention include ladder type filters such as L-type, T-type and π-type filters, lattice type filters and crystal filters.

As such filters are inserted into an apparatus according to the invention, the transmittivity of high frequency waves with the fundamental oscillation frequency may be reduced, if slightly. Therefore, the wattmeters of the apparatus are preferably calibrated with the low pass filters held in place.

Low pass filters that can suitably be used for the purpose of the invention will be described in detail below.

Figure 3:
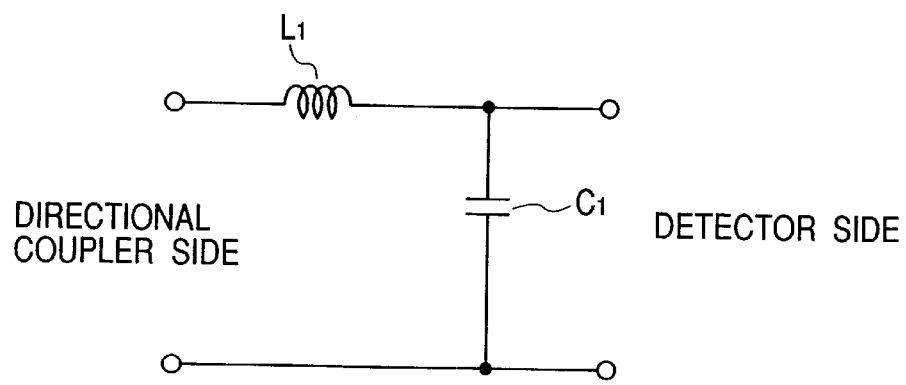
FIG. 3 is a schematic circuit diagram of a low pass filter that can be used for the purpose of the invention.
Figure 4:
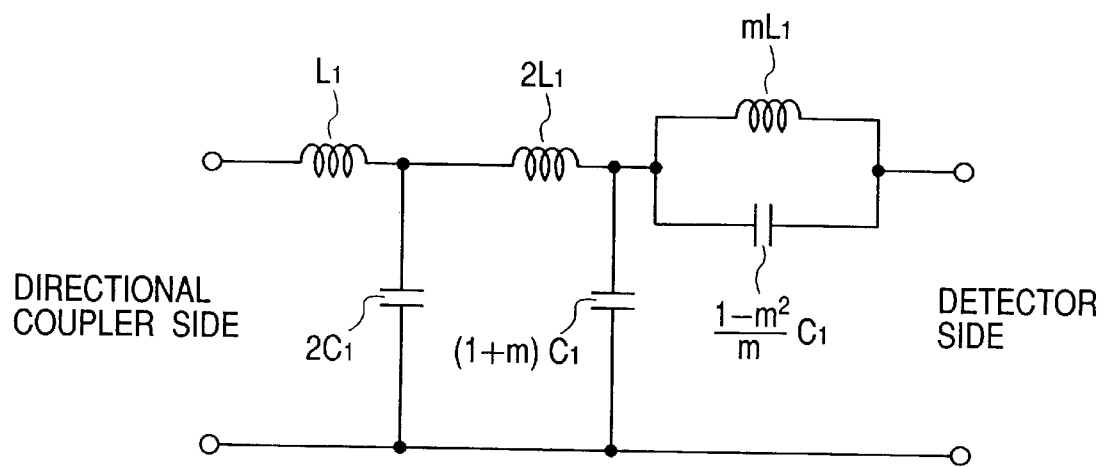
FIG. 4 is a schematic circuit diagram of another low pass filter that can be used for the purpose of the invention.

FIGS. 3 and 4 are schematic circuit diagrams of two low pass filters comprising one or more than one inductances and one or more than one electrostatic capacitances.

Note that in FIGS. 3 and 4, the directional coupler is located to the left of the filter, while the related detector is located to the right of the filter. In the circuit of FIG. 3, an inductance L1 is inserted to the power supply line side, and an electrostatic capacitance C1 is arranged to the detector side thereof and connected to the power supply line and the grounding line.

In the circuit of FIG. 4, on the other hand, a pair of combinations of an inductance L and an electrostatic capacitance C as shown in FIG. 3 are used, in addition to a combination of an inductance L and an electrostatic capacitance C that are inserted in parallel on the power supply line.

While the positional relationship of the inductances L and the electrostatic capacitances C are shown in FIGS. 3 and 4, L1, C1 and m of each of the circuits respectively satisfy the following equations.

$$L1=R1/(2\pi fc), C1=1/(2\pi fcR1) \text{ and } m=\sqrt{1-(fc/f\infty)^2},$$

where fc represents the cut-off frequency, f∞ represents the oscillation frequency and R1 represents the nominal inductance. Thus, L1, C1 and m may be selected appropriately according to the frequency band of waves to be transmitted so as to make them satisfy the above-described requirements.

Figure 5:
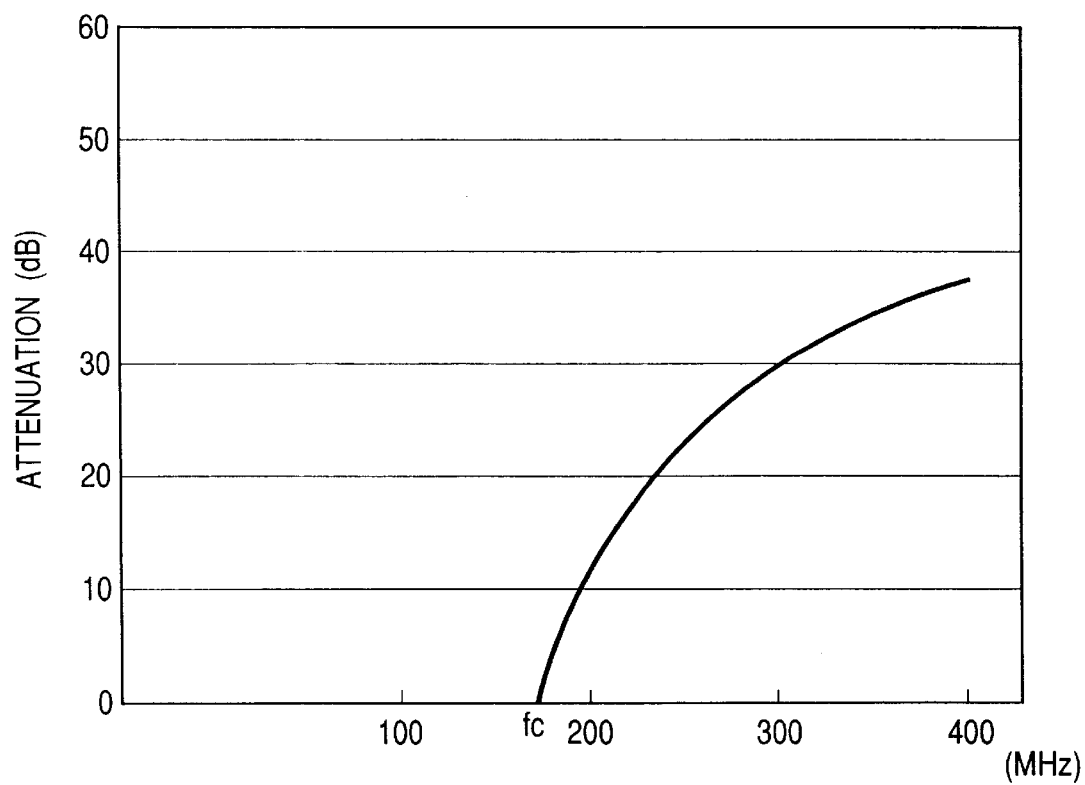
FIG. 5 is a graph showing the frequency attenuation characteristics of the low pass filter of FIG. 3.
Figure 6:
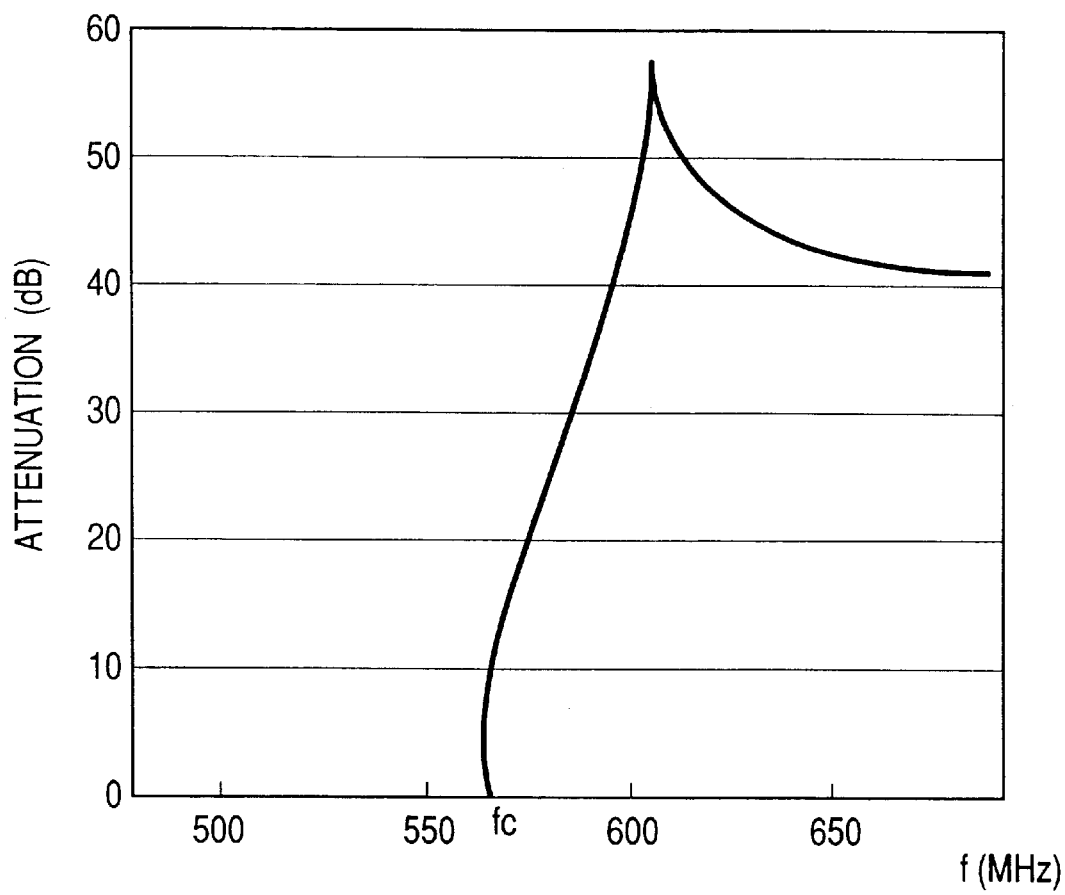
FIG. 6 is a graph showing the frequency attenuation characteristics of the low pass filter of FIG. 4.

Then, the frequency attenuation characteristics as shown in FIG. 5 may be obtained by a circuit shown in FIG. 3, whereas those as shown in FIG. 6 may be obtained by a circuit shown in FIG. 4.

Figure 7:
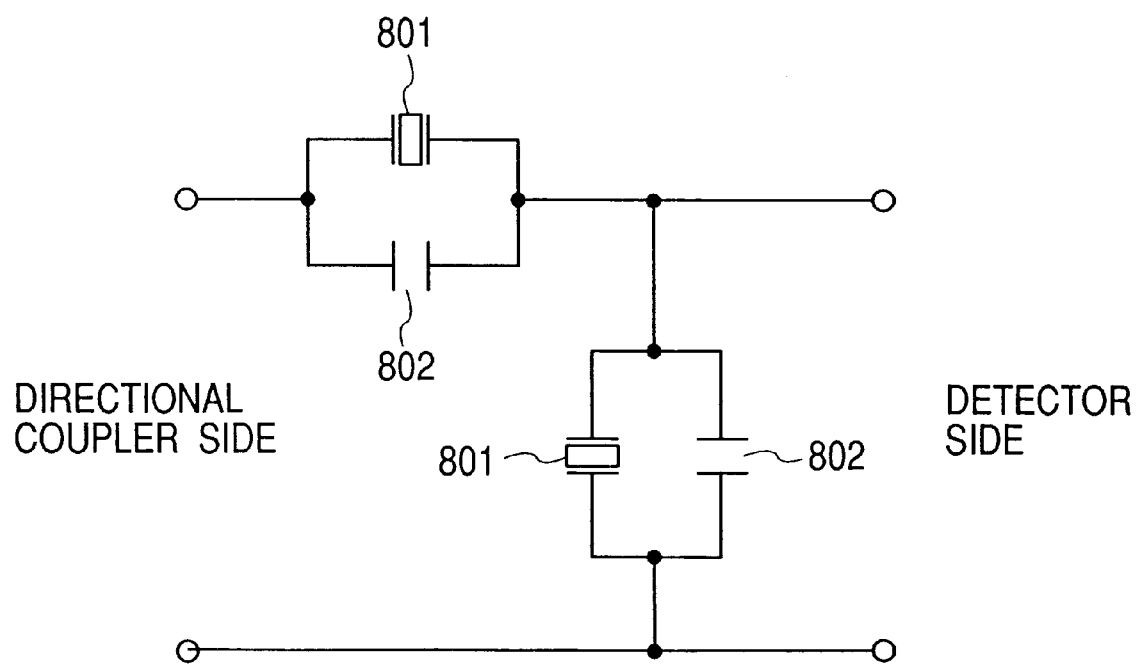
FIG. 7 is a schematic circuit diagram of still another low pass filter that can be used for the purpose of the invention.

FIG. 7 is a circuit diagram of a low pass filter comprising crystal filters. In FIG. 7, reference numerals 801 and 802 respectively denote a piece of crystal and a capacitor.

Such a filter circuit may be designed by using one or more than one pieces of crystal and one or more than one capacitors showing appropriate respective characteristics depending on the frequency band of waves to be transmitted.

Figure 8:
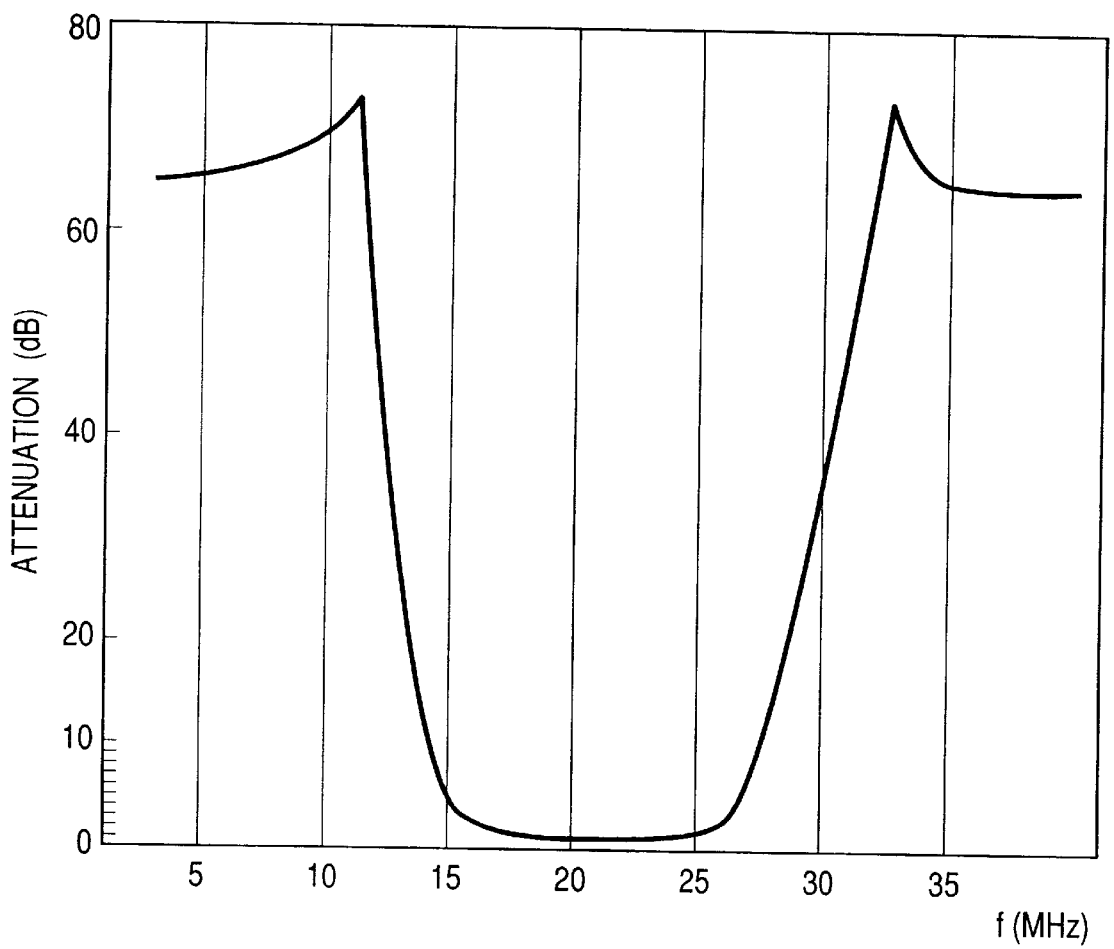
FIG. 8 is a graph showing the frequency attenuation characteristics of the low pass filter of FIG. 7.

FIG. 8 is a graph showing the frequency attenuation characteristics of a crystal filter that can be used for the purpose of the invention.

It should be noted that the use of low pass filters in a plasma processing apparatus according to the invention is very important. While any low pass filters that can effectively remove the harmonics entering the detectors may be arranged at any locations to make them operate properly for the purpose of the invention, they are preferably arranged between the directional coupler and the respective detectors for the reasons as listed below.

If the low pass filters are used simply to cut off harmonics, they may be arranged between the power source and the load. Then, the principal routes through which harmonics enter the detectors are (1) the ones originating from the power source side and terminating at the load (discharge electrode) side but led to the detectors by the directional coupler and (2) the ones originating from the load (discharge electrode) side and terminating at the power source side but led to the detectors by the directional coupler.

Thus, at least low pass filters will have to be arranged at two locations between the power source and the load, more specifically between the power source and the detectors and between the load (discharge electrode) and the detectors. The high frequency current that flows between the power source and the load is required to show a power level sufficiently high for the plasma processing operation and hence much greater than the electric current flowing toward the detectors by way of the directional coupler. Then, the low pass filters arranged between the power source and the load have to be adapted to a large electric current. As a result, (1) the low pass filters will be very large to limit the extent of freedom of designing the apparatus and raise the cost of the apparatus, and (2) power is lost at the low pass filters themselves giving rise to a problem that power is not effectively delivered from the power source to the load, particularly when a plurality of low pass filters are arranged therebetween along each flow route of electric current. These problems may become more serious when large power is used.

Therefore, low pass filters are preferably arranged between the directional coupler and the respective detectors to fully exploit the advantages of the present invention.

<High Frequency Power>

High frequency power whose fundamental oscillation frequency of a VHF is used for the purpose of the invention.

The VHF that is used for the purpose of the invention is found between a frequency range higher than the RF frequency of 13.56 MHz that is popularly used for known plasma processing apparatus and lower than the microwave frequency of 2.45 GHz. More specifically, it is found between about 20 MHz and about 500 MHz.

A relatively high frequency will be selected within the above frequency range when a high plasma density and an enhanced deposition rate are required, a relatively low frequency will be selected to use a long wavelength that can provide an enhanced uniformity of film deposition over a large area when a film has to be formed uniformly by deposition over a large area.

<Plasma Processing Section 110>

Plasma processing apparatus for conducting a processing operation by generating plasma and using the generated plasma include deposition film forming apparatus as described earlier. With such an apparatus, source gas for forming a deposition film is fed to the vacuum vessel 103 that is provided with a vacuuming/exhausting means and, at the same time, high frequency power with a frequency in the VHF range is applied to form a film by deposition on the surface of the substrate 107 arranged in the vacuum vessel 103.

In the case of depositing amorphous silicon film, at least source gas such as $SiH_4$ and $Si_2H_6$ and, if necessary, appropriate diluting gas such as $H_2$ are fed into the vacuum vessel 103 that has been evacuated by means of a vacuum pump and, at the same time, VHF power is emitted into the internal space of the vacuum vessel 103 from a power emitting means such as an antenna 109 to decompose the source gas by means of an electric discharge and form a deposition film on the surface of a substrate 107 which is typically made of glass or metal and whose temperature is controlled within a range between about 150 and about 350° C.

Specific examples of compounds that contain silicon atoms and can be gasified typically include chain and ring silane compounds such as $SiH_4$, $Si_2H_6$, $SiF_4$, $SiFH_3$, $SiF_2H_2$, $SiF_3H$, $Si_3H_8$, $SiD_4$, $SiHD_3$, $SiH_2D_2$, $SiH_3D$, $SiFD_3$, $SiF_2D_2$, $Si_2D_3H_3$, $(SiF_2)_5$, $(SiF_2)_6$, $(SiF_2)_4$, $Si_2F_6$, $Si_3F_8$, $Si_2H_2F_4$, $Si_3H_3F_3$, $SiCl_4$, $(SiCl_2)_5$, $SiBr_4$, $(SiBr_2)_5$, $Si_2Cl_6$, $SiHCl_3$, $SiH_2Br_2$, $SiH_2Cl_2$ and $Si_2Cl_3Br_3$, which are compounds that are found in a gaseous state or can be easily gasified. D in the above formulas denotes heavy hydrogen (denterium).

In the case of depositing non-single crystal silicon germanium, compounds containing germanium atoms that can be easily gasified and hence can be used for source gas for the purpose of the invention include $GeH_4$, $GeD_4$, $GeF_4$, $GeFH_3$, $GeF_2H_2$, $GeF_3H$, $GeHD_3$, $GeH_2D_2$, $GeH_3D$, $Ge_2H_6$ and $Ge_2D_6$.

In the case of depositing non-single crystal silicon carbide, compounds containing carbon atoms that can be easily gasified and hence can be used for source gas for the purpose of the invention include $CH_4$, $CD_4$, $C_nH_{2n+2}$ (where n represents an integer), $C_nH_{2n}$ (where n represents an integer), $C_2H_2$, $C_6H_6$, $CO_2$ and CO.

Substances that can be introduced into the p-type layer or the n-type layer for controlling valence electrons include the elements of Group III and Group V of the periodic table.

Substances that can be used for the starting substance for introducing an element of the III group include boron. Then, compounds that can be used for introducing boron atoms include boron hydrides such as $B_2H_6$ and boron halogenides such as $BF_3$ and $BCl_3$.

Substances that can be used for the starting substance for introducing an element of the Group V include phosphorus and arsenic. Then, compounds that can be used for introducing phosphorus atoms include phosphorus hydrides such as $PH_3$ and phosphorus halogenides such as $PF_3$. For introducing arsenic atoms, typically $AsH_3$ can be used.

The easily gasified compound may be diluted by $H_2$, He, Ne, Ar, Xe or Kr before being introduced into the film forming chamber.

While the discharge electrode may have any appropriate profile, it preferably is not in the form of a plate but rather in the form of a straight rod or a rod with radial fins or comb-like teeth having a relatively small surface area.

Now, an embodiment of a deposition film forming apparatus according to the invention will be described below, although the present invention is by no means limited thereto.

FIG. 2 is a schematic block diagram of an embodiment of deposition film forming apparatus, showing its basic components. Then, a belt-like substrate was fed continuously through a roll-to-roll continuous deposition film forming apparatus having a configuration as shown in FIG. 9 and comprising a total of six deposition film forming apparatuses in order to produce a six-layered non-single crystal silicon semiconductor film laminate on the substrate for double-layered tandem type solar batteries.

Figure 9:
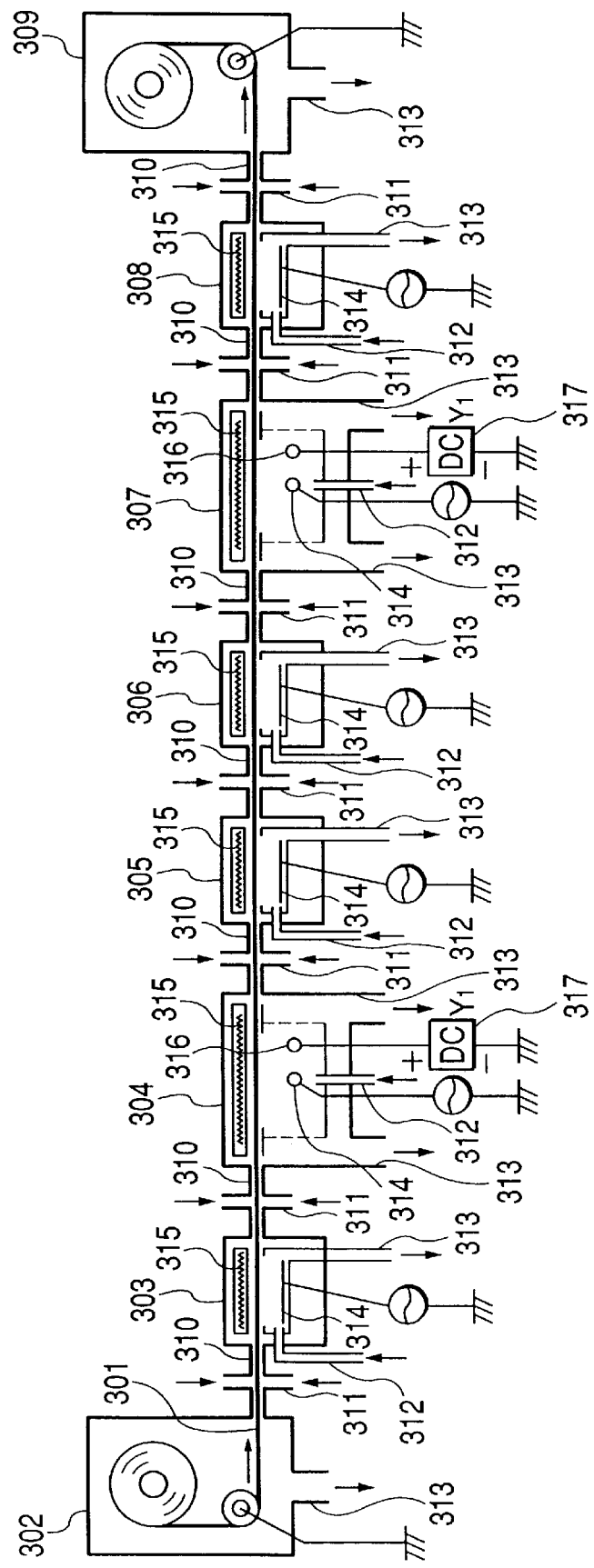
FIG. 9 is a schematic diagram of a roll-to-roll type deposition film forming apparatus comprising a number of plasma processing apparatuses according to the invention.

Referring to FIG. 9, a long belt-like substrate 301 is fed from a feeding chamber 302, where it is wound in the form of a web and made to sequentially pass through plasma discharge chambers 303 through 308 before it is taken up into a take-up chamber 309 provided with a take-up mechanism (not shown) to produce a web. The feeding chamber 302, the plasma discharge chambers 303 through 308 and the take-up chamber 309 are held in communication with the respective adjacent chambers by way of a gas gate 310.

Each of the gas gates 310 through which the belt-like substrate 301 passes is provided with a gate gas inlet pipe 311 at a position located close to the center thereof, along the moving direction of the substrate. Gas such as $H_2$ gas or He gas is introduced into the gas gate 310 to produce a gas flow directed from the center of the gas gate to the adjacently located downstream chamber so that the source gases of adjacently located chambers are prevented from being mixed and thus separated appropriately.

Each of the plasma discharge chambers 303 through 308 is provided with a gas inlet pipe 312, an exhaust pipe 313, a discharge electrode 314 and a substrate heater 315 so that semiconductor films are sequentially laid on the belt-like substrate as the latter passes through the plasma discharge chambers.

Of the plasma discharge chambers 303 through 308 in the apparatus incorporating a number of plasma processing apparatuses as shown in FIG. 9, the plasma discharge chambers 304 and 307 are deposition film forming apparatus according to the invention, wherein a frequency of 105 MHz is used for high frequency discharges. Amorphous silicon germanium and amorphous silicon are deposited respectively in the plasma discharge chamber 304 and the plasma discharge chamber 307. Otherwise, a frequency of 13.56 MHz is used for high frequency discharges in the remaining plasma discharge chambers 303, 305, 306 and 308.

In each of the plasma discharge chambers 304 and 307 using a discharge frequency of 105 MHz, high frequency power is emitted into the internal space of the chamber from an antenna-like discharge electrode 314 arranged within the chamber. Additionally, each of the plasma discharge chambers 304 and 307 is provided with a bias electrode 316 in addition to the discharge electrode 314, to which bias electrode 316 a DC voltage is applied from a DC power source 317.

EXAMPLE 1

In this example, a double-layered tandem type solar battery comprising six silicon based non-single crystal film layers and showing a nipnip structure was prepared by means of the apparatus of FIG. 9 which was realized by incorporating a plurality of appratuses according to the invention as shown in FIG. 2.

Of the film forming chambers in FIG. 9, the chambers 304 and 307 were plasma CVD chambers using a high frequency of 105 MHz, which is found in the VHF zone. As shown in FIG. 2, a pair of low pass filters 120, each comprising an L and a C arranged to show a configuration of FIG. 3 and designed to maintain frequencies below 160 MHz by 90% and damp frequencies above 310 MHz to below 10%, were inserted respectively into the incident and reflected power detection circuits 111 of the high frequency power source 102.

The apparatus of FIG. 9 was so arranged that a belt-like stainless steel (SUS430-BA) substrate 301, which was 500 m long, 356 mm wide and 0.15 mm thick and wound around a bobbin in the feeding chamber 302, was to be fed out to pass through the plasma discharge chambers 303 through 308 by way of the gas gates 310 and taken up onto the bobbin in the take-up chamber 309 with tension applied to it by a tensile force applying mechanism (not shown).

Then, each of the vacuum vessels 302 through 309 was evacuated to less than 1 Pa by vacuuming means of the vessel.

Subsequently, helium gas was introduced into each of the plasma discharge chambers at a rate of 100 sccm by way of the corresponding gas inlet pipe 312 connected to the gas supply means (not shown) of the chamber, while constantly exhausting the chamber, to keep the internal pressure of the vacuum vessel equal to 100 Pa by regulating the opening of the exhaust valve (not shown) of the exhaust pipe 313.

Under this condition, the belt-like substrate was made to move constantly at a rate of 600 mm per minute by means of the substrate transfer mechanism (not shown) connected to the bobbin of the take-up chamber 309.

Then, the belt-like substrate 301 moving through each of the plasma discharge chambers was heated by the substrate heater 315 of the chamber to the predetermined temperature level, while monitoring the temperature of the substrate by means of a substrate temperature monitor (not shown) belonging to the chamber.

When the substrate 301 in each of the plasma discharge chambers was heated evenly, the supply of helium gas was suspended and switched to the supply of source gas containing $SiH_4$, as the substrate was constantly heated.

At the same time, $H_2$ gas was introduced to each of the gas gates 110 through the corresponding gate gas inlet pipe 311 connected to the gas supply means (not shown) of the gas gate in order to separate the source gas.

Then, high frequency power was supplied to the discharge electrode 314 of each of the plasma discharge chambers from the high frequency power source to generate a glow discharge in the glow discharge chamber and decompose the source gas into plasma so that consequently a silicon based non-single crystal film was deposited on the continuously moving belt-like substrate 301 in each chamber as a semiconductor film to be used for a double-layered tandem type solar battery comprising silicon based non-single crystal semiconductors.

The discharge frequency of the plasma discharge chambers 304 and 307 was 105 MHz, and a rod-shaped discharge electrode was used in each of the chambers. The discharge frequency of the plasma discharge chambers 303, 305, 306, 308 was 13.56 MHz, and a plate-like discharge electrode was used in each of the chambers.

A DC voltage of 300V was applied to the bias electrode of the plasma discharge chamber 304 in a positive direction relative to the belt-like substrate which was held to the ground potential. A DC voltage of 100V was applied to the bias electrode of the plasma discharge chamber 307 in a positive direction relative to the belt-like substrate held to the ground potential.

The film forming conditions of the plasma discharge chambers are shown in Table 1 below.

TABLE 1

| | Discharge Chamber 303 | Discharge Chamber 304 | Discharge Chamber 305 | Dischage Chamber 306 | Discharge Chamber 307 | Dichage Chamber 308 |
|---|---|---|---|---|---|---|
| Deposition Film | a-Si (n-type) | a-SiGe (i-type) | Fine Crystal Si (p-type) | a-Si (n-type) | a-Si (i-type) | Fine Crystal Si (p-type) |
| Deposition Film Thickness | 20 nm | 100 nm | 10 nm | 20 nm | 100 nm | 10 nm |
| Bias Voltage | | 300 V | | | 100 V | |
| Discharge Frequency | 13.56 MHz | 105 MHz | 13.56 MHz | 13.56 MHz | 105 MHz | 13.56 MHz |
| Discharge Power | 200 W | 1,500 W | 1,500 W | 200 W | 1,500 W | 1,500 W |
| Source Gas Flow Rate | $SiH_4$ = 200 sccm $H_2$ = 800 sccm $PH_3$ = 18 sccm | $SiH_4$ = 200 sccm $GeH_4$ = 200 sccm $H_2$ = 200 sccm | $SiH_4$ = 20 sccm $H_2$ = 2,000 sccm $BF_3$ = 1 sccm | $SiH_4$ = 200 sccm $H_2$ = 800 sccm $PH_3$ = 18 sccm | $SiH_4$ = 400 sccm $H_2$ = 1,200 sccm | $SiH_4$ = 20 sccm $H_2$ = 2,000 sccm $BF_3$ = 1 sccm |
| Substrate Temperature | 300° C. | 330° C. | 200° C. | 300° C. | 220° C. | 200° C. |
| Pressure | 133 Pa | 3 Pa | 133 Pa | 133 Pa | 3 Pa | 133 Pa |
| Average Deposition Rate | 0.4 nm/sec. | 4 nm/sec. | 0.1 nm/sec. | 0.4 nm/sec. | 4 nm/sec. | 0.1 nm/sec. |

After the above film deposition was continuously effected on the belt-like substrate over a length of 400 m, the supply of discharge power and source gas to the plasma discharge chambers was suspended, along with the heating of the belt-like substrate and the inside of each of the chambers was purged sufficiently before the belt-like substrate. The inside of the apparatus were cooled down and the apparatus was exposed to the atmosphere. Then, the belt-like substrate taken up onto the bobbin of the take-up chamber and carrying thereon a semiconductor laminate was removed from the apparatus.

During the process of forming deposition films, the reading of the wattmeter for the incident power of each of the plasma discharge chambers 304 and 307 was stable with fluctuations within ±5% and that of the wattmeter for the reflected power was also stable and found to be less than 3% of that of the incident power.

The matching circuit 112 could realize an adequate matching without difficulty on a stable basis.

When the incident side output of the directional coupler 116 of the power detection circuit 111 was observed by means of a spectrum analyzer with the low pass filter 120 inserted in position and the matching circuit 112 operating properly for matching, it was found that the output contained the second harmonic and the third harmonic respectively by 15% and 10% before passing through the filter 120 but they were reduced to less than 1% of the fundamental wave after passing through the filter 120.

Then, the removed belt-like substrate was processed continuously on a continuous module generator to form an ITO thin film as transparent electrode on the entire surface of the semiconductor laminate and also form filament-like Ag electrodes arranged at regular intervals as collector electrodes. Thus, 35 cm square double-layered tandem type solar battery modules showing a nipnip structure were prepared continuously.

The prepared solar battery modules were tested to evaluate performance, while being irradiated with pseudo-sun beams to an intensity of AM1.5 (100 mW/cm$^2$).

As a result of the test, the photoelectric conversion efficiency of the prepared solar battery modules was stable over the entire length of 400 m of the roll with fluctuations within ±3%.

Additionally, a total of 10 rolls of solar battery modules were prepared, each of which extended over 400 m on a 500 m long roll of SUS substrate, and the average photoelectric conversion efficiency of each of the rolls of solar battery modules was obtained for comparison to find that it was stable with fluctuations within ±3%.

Comparative Example 1

For the purpose of comparison, double-layered tandem type solar battery modules were prepared continuously by replacing the power detection circuits of the high frequency power sources of the discharge chambers 304 and 307 with ones not comprising low pass filters as shown in FIG. 1.

During the process of forming deposition films, the reading of the wattmeter for the incident power of each of the plasma discharge chambers 304 and 307 was unstable with fluctuations as large as ±15% and that of the wattmeter for the reflected power was also unstable and found to be more than 15% of that the incident power.

It was difficult to find a point where the reflection is reduced by the matching circuit 112, and the matched state, if any, during the film forming process was also unstable.

When the incident side output of the directional coupler 216 of the power detection circuit 212 was observed by means of a spectrum analyzer under a condition where the matching was so regulated as to minimize the reflection, it was found that the second harmonic and the third harmonic were contained in the output respectively by 30% and 20% of the fundamental wave.

The prepared solar battery modules were tested to evaluate the performance, and it was found that the photoelectric conversion efficiency of the prepared solar battery modules was unstable over the entire length of 400 m of the roll with fluctuations as large as ±20%.

Additionally, a total of 10 rolls of solar battery modules were prepared, each of which extended over 400 m on a 500 m long roll of SUS substrate, and the average photoelectric conversion efficiency of each of the rolls of solar battery modules was obtained for comparison to find that the reproducibility of the characteristics was very low with fluctuations as large as ±25%.

EXAMPLE 2

In this example, the procedures of EXAMPLE 1 were followed to prepare 35 cm square double-layered tandem type solar battery modules showing a nipnip structure on a continuous basis except that 20 MHz was used for the discharge frequency of the discharge chambers 304 and 307, and a pair of low pass filters 120, each comprising Ls and Cs arranged to show a configuration of FIG. 7 and designed to maintain frequencies below 25 MHz by 90% and damp frequencies above 35 MHz to below 10%, were inserted.

During the process of forming deposition films, the reading of the wattmeter for the incident power of each of the plasma discharge chambers 304 and 307 was stable with fluctuations within ±3% and that of the wattmeter for the reflected power was also stable and found to be less than 2% of that the incident power.

The matching circuit 112 could realize an adequate matching without difficulty on a stable basis.

When the incident side output of the directional coupler 116 of the power detection circuit 111 was observed by means of a spectrum analyzer with the low pass filter 120 inserted in position and the matching circuit 112 operating properly for matching, it was found that the output contained the second harmonic and the third harmonic respectively by 10% and 5% before passing through the filter 120, but they were reduced to less than 0.5% of the fundamental wave after passing through the filter 120.

The prepared solar battery modules were tested to evaluate performance, while being irradiated with pseudo-sun beams to an intensity of AM1.5 (100 mW/cm$^2$).

As a result of the test, the photoelectric conversion efficiency of the prepared solar battery modules was stable over the entire length of 400 m of the roll with fluctuations within ±2%.

Additionally, a total of 10 rolls of solar battery modules were prepared, each of which extended over 400 m on a 500 m long roll of SUS substrate, and the average photoelectric conversion efficiency of each of the rolls of solar battery modules was obtained for comparison to find that it was stable with fluctuations within ±2%.

EXAMPLE 3

In this example, the procedures of EXAMPLE 1 were followed to prepare 35 cm square double-layered tandem type solar battery modules showing a nipnip structure on a continuous basis, except that 45 MHz was used for the discharge frequency of the discharge chambers 304 and 307, and a pair of low pass filters 120, each having a configuration of FIG. 4 and designed to maintain frequencies below 550 MHz by 90% and damp frequencies above 600 MHz to below 10%, were inserted.

During the process of forming deposition films, the reading of the wattmeter for the incident power of each of the plasma discharge chambers 304 and 307 was stable with fluctuations within ±5% and that of the wattmeter for the reflected power was also stable and found to be less than 3% that of the incident power.

The matching circuit 112 could realize an adequate matching without difficulty on a stable basis.

When the incident side output of the directional coupler 116 of the power detection circuit 111 was observed by means of a spectrum analyzer with the low pass filter 120 inserted in position and the matching circuit 112 operating properly for matching, it was found that the output contained the second harmonic and the third harmonic respectively by 15% and 8% before passing through the filter 120, but they were reduced to less than 1% of the fundamental wave after passing through the filter 120.

The prepared solar battery modules were tested to evaluate performance, while being irradiated with pseudo-sun beams to an intensity of AM1.5 (100 mW/cm$^2$).

As a result of the test, the photoelectric conversion efficiency of the prepared solar battery modules was stable over the entire length of 400 m of the roll with fluctuations within ±3%.

Additionally, a total of 10 rolls of solar battery modules were prepared, each of which extended over 400 m on a 500 m long roll of SUS substrate, and the average photoelectric conversion efficiency of each of the rolls of solar battery modules was obtained for comparison to find that it was stable with fluctuations within ±3%.

As described above in detail, according to the invention, there are provided a high frequency plasma processing apparatus and a high frequency plasma processing method that can suitably be used for uniformly forming on a substrate a deposition film over a large area. The present invention solves the problem that the high frequency power supplied to a known plasma processing apparatus can become distorted and produce harmonics, thereby giving rise to the difficulty of correctly reading the incident and reflected powers and realizing an accurate matching when a VHF is used in order to raise the processing rate.

What is claimed is:

1. A plasma processing apparatus adapted to apply high frequency power to the inside of a vacuum vessel to generate plasma to be used for a processing operation, characterized in that the fundamental oscillation frequency of the high frequency power is a VHF and low pass filters for passing the fundamental oscillation frequency component and damping any harmonics thereof are inserted into an incident power detection circuit and a reflected power detection circuit of the high frequency power source of the apparatus.

2. The plasma apparatus according to claim 1, wherein the discharge electrode is a rod-shaped electrode.

3. The plasma processing apparatus according to claim 1, wherein said low pass filters maintain the fundamental oscillation frequency component by more than 90% and damp the harmonics to less than 10%.

4. The plasma processing apparatus according to claim 1, wherein said processing operation comprises formation of a deposited film.

5. A plasma processing apparatus adapted to apply high frequency power to the inside of a vacuum vessel to generate plasma to be used for a processing operation, characterized in that the fundamental oscillation frequency of the high frequency power is a VHF and low pass filters for passing the fundamental oscillation frequency component and damping any harmonics thereof are inserted into an incident power detection circuit and a reflected power detection circuit of the high frequency power source of the apparatus, wherein the incident power and reflected power detection circuit of the high frequency power source comprises a directional coupler provided at least in the output line of the high frequency power and detectors connected to the directional coupler and the low pass filters are inserted between the directional coupler and the respective detectors.

6. A plasma processing method adapted to apply high frequency power to the inside of a vacuum vessel to generate plasma to be used for a processing operation, the fundamental oscillation frequency of the high frequency power being a VHF comprising the steps of:

detecting the fundamental oscillation frequency by way of low pass filters for passing the fundamental oscillation frequency component and damping any harmonics thereof, said low pass filters being inserted into an incident power detection circuit and a reflected power detection circuit of a high frequency power source; and maintaining the fundamental oscillation frequency component by more than 90% while damping the harmonics to less than 10%.

7. The plasma processing method according to claim 6, wherein matching between a load and a power source is controlled according to a detected value of the fundamental oscillation frequency component.

8. The plasma processing method according to claim 6, wherein said processing operation comprises formation of a deposited film.

9. The plasma processing method according to claim 8, wherein said deposited film includes a semiconductor film.

10. A plasma processing apparatus adapted to apply high frequency power which is a VHF to the inside of a vacuum vessel to generate plasma to be used for a plasma processing operation, said apparatus being connected to a power detection means by way of at least a low pass filter capable of passing a fundamental oscillation frequency and damping any harmonics of the high frequency power separated from a power supply line for introducing the high frequency power into said vacuum vessel, said low pass filter maintaining the fundamental oscillation frequency component by more than 90% while damping the harmonics to less than 10%.

11. The apparatus according to claim 10, wherein the VHF has a fundamental oscillation frequency between 20 MHz and 500 MHz.

12. The apparatus according to claim 10, wherein the separation from the power supply line is performed by means of a directional coupler.

13. The apparatus according to claim 10, wherein said power detection means includes a detector.

14. The apparatus according to claim 10, wherein an electrode for applying the high frequency is arranged in said vacuum vessel.

15. The apparatus according to claim 14, wherein said electrode comprises a rod-shaped electrode.

16. The apparatus according to claim 10, wherein said power detection means is provided for detecting a reflected power reflected from the vacuum vessel side.

17. The apparatus according to claim 10, wherein said power detection means is provided for detecting an incident power supplied to the vacuum vessel side.

18. The apparatus according to claim 10, wherein said power detection means is connected to the power supply line by way of a directional coupler and is capable of detecting a reflected power reflected from the vacuum vessel side and an incident power supplied to the vacuum vessel side.

19. The apparatus according to claim 18, wherein said power means is provided separately for detecting the reflected power and for detecting the incident power.

20. The plasma processing apparatus according to claim 10, wherein said plasma processing operation comprises formation of a deposited film.

21. A plasma processing method for applying high frequency power which is a VHF to the inside of a vacuum vessel to generate plasma to conduct a plasma processing operation, comprising a step of adjusting a plasma processing parameter by detecting a power by means of a power detection means connected by way of at least a low pass filter capable of passing a fundamental oscillation frequency and damping any harmonics of the high frequency power separated from a power supply line for introducing the high frequency power into the vacuum vessel, said low pass filter maintaining the fundamental oscillation frequency component by more than 90% while damping the harmonics to less than 10%.

22. The method according to claim 21, wherein said step of adjusting a plasma processing parameter includes realizing matching of a matching circuit provided in the power supply line.

23. The plasma processing method according to claim 21, wherein said power detection means is provided for detecting a reflected power reflected from the vacuum vessel side.

24. The plasma processing method according to claim 21, wherein said detection means is provided for detecting an incident power supplied to the vacuum vessel side.

25. The plasma processing method according to claim 21, wherein said power detection means is connected to the power supply line by way of a directional coupler and is capable of detecting a reflected power reflected from the vacuum vessel side and an incident power supplied to the vacuum vessel side.

26. The plasma processing method according to claim 21, wherein said plasma processing operation comprises formation of a deposited film.

27. The plasma processing method according to claim 26, wherein said deposited film includes a semiconductor film.

\* \* \* \* \*

UNITED STATES PATENT AND TRADEMARK OFFICE
CERTIFICATE OF CORRECTION

PATENT NO.     : 6,313,430 B1
DATED          : November 6, 2001
INVENTOR(S)    : Yasushi Fujioka et al.

It is certified that error appears in the above-identified patent and that said Letters Patent is hereby corrected as shown below:

Title page,
Item [*] Notice, insert:

-- [*] Notice:   This patent issued on a continued prosecution application filed under 37 CFR 1.53(d), and is subject to the twenty year patent term provisions of 35 U.S.C. 154(a)(2). --

Column 2,
Line 5, "but" should read -- but rather in the form of --.

Column 3,
Line 21, "to become apt generate har" should read -- and generates harmonies, thereby making --;
Line 22, "monics and make" should be deleted;
Line 28, "operation, wherein" should read -- operation. According to the present invention, --;
Line 30, "VHF" should read -- VHF, --; and
Line 39, "coupler" should read -- coupler, --.

Column 7,
Line 3, "required, a" should read -- required. A --;
Line 13, "means" should read -- means, --;
Line 22, "pump" should read -- pump, --;
Line 35, "$Si_3H_3F_3$" should read -- $Si_2H_3F_3$, --;
Line 38, "(denterium)." should read -- (deuterium). --;
Line 55, "the III group" should read -- Group III --; and
Line 60, "the" should be deleted.

Column 9,
TABLE 1, under "Chamber 304", "Discharge $H_2$=200 sccm" should read -- $H_2$=1,200 sccm --.

Column 10,
Line 48, "substrate and the" should read -- substrate. The --; and
Line 49, "substrate. The" should read -- substrate and the --.

Column 11,
Line 52, "the" (first occurrence) should be deleted.

UNITED STATES PATENT AND TRADEMARK OFFICE
CERTIFICATE OF CORRECTION

PATENT NO. : 6,313,430 B1
DATED : November 6, 2001
INVENTOR(S) : Yasushi Fujioka et al.

It is certified that error appears in the above-identified patent and that said Letters Patent is hereby corrected as shown below:

<u>Column 14,</u>
Line 50, "means" should read -- detection means --.

Signed and Sealed this

Twentieth Day of August, 2002

Attest:

Attesting Officer

JAMES E. ROGAN
*Director of the United States Patent and Trademark Office*